United States Patent
Shimizu

(10) Patent No.: US 7,480,750 B2
(45) Date of Patent: Jan. 20, 2009

(54) OPTIMIZATION OF BUFFER POOL SIZES FOR DATA STORAGE

(75) Inventor: Junya Shimizu, Yokohama (JP)

(73) Assignee: International Buisiness Machines Corporation, Armonk, NY (US)

( * ) Notice: Subject to any disclaimer, the term of this patent is extended or adjusted under 35 U.S.C. 154(b) by 424 days.

(21) Appl. No.: 11/128,468

(22) Filed: May 13, 2005

(65) Prior Publication Data
US 2005/0267891 A1    Dec. 1, 2005

(30) Foreign Application Priority Data
May 14, 2004    (JP)    ............... 2004-145649

(51) Int. Cl.
*G06F 3/00* (2006.01)
(52) U.S. Cl. ........................ 710/56; 711/171
(58) Field of Classification Search ............ 710/56; 711/171
See application file for complete search history.

(56) References Cited

U.S. PATENT DOCUMENTS

| | | | | |
|---|---|---|---|---|
| 5,179,662 | A | * | 1/1993 | Corrigan et al. ............... 711/2 |
| 5,524,214 | A | * | 6/1996 | Kurihara ....................... 710/56 |
| 5,875,442 | A | * | 2/1999 | Jordan et al. .................. 707/2 |
| 2002/0087758 | A1 | * | 7/2002 | Dixon ........................... 710/56 |
| 2005/0066109 | A1 | * | 3/2005 | Veazey et al. .................. 711/1 |

FOREIGN PATENT DOCUMENTS

JP    10-214213    8/1998
JP    2000-293415    10/2000

OTHER PUBLICATIONS

Scherer, PC and Stepanian, R, "Algorithm for Calculating Optimum Receive Bufer Size and Number in Token Ring Adapter", Jan. 1, 1992, IBM TDB, vol. 34, No. 8, pp. 358-359.*
Yan Xu, Yilin Chang, and Zengji Liu; "Calculation and Analysis of Compensation Buffer Size in Multimedia Systems"; Aug. 2001; IEE; vol. 5, No. 8; pp. 355-357.*
Diao et al. "Generic Online Optimization of Multiple Configuration Parameters with Application to a Database Server," pp. 3-15, Lecture Notes in Computer Science 2867, Springer 2003.

* cited by examiner

*Primary Examiner*—Ilwoo Park
*Assistant Examiner*—Elias Mamo
(74) *Attorney, Agent, or Firm*—Scully, Scott, Murphy & Presser, P.C.; Lisa M. Yamonaco

(57) ABSTRACT

Sizes of buffer pools for temporarily storing data from a database are dynamically optimized. A database server includes: a dividing ratio setting unit for setting a dividing ratio for dividing a memory area of a predetermined size into a plurality of buffer pools used selectively according to a type of transaction or type of data; a response time measuring unit for measuring response time of transactions; a response time computation formula generating unit for calculating parameters of a response time calculation formula for calculating the response time based on the size of each of the plurality of buffer pools from the set dividing ratio and the measured response time; and a dividing ratio calculation unit for calculating the dividing ratio that minimizes the response time by using the response time calculation formula; wherein the dividing ratio setting unit sets the dividing ratio calculated by the dividing ratio calculating unit.

15 Claims, 5 Drawing Sheets

[Figure 1]
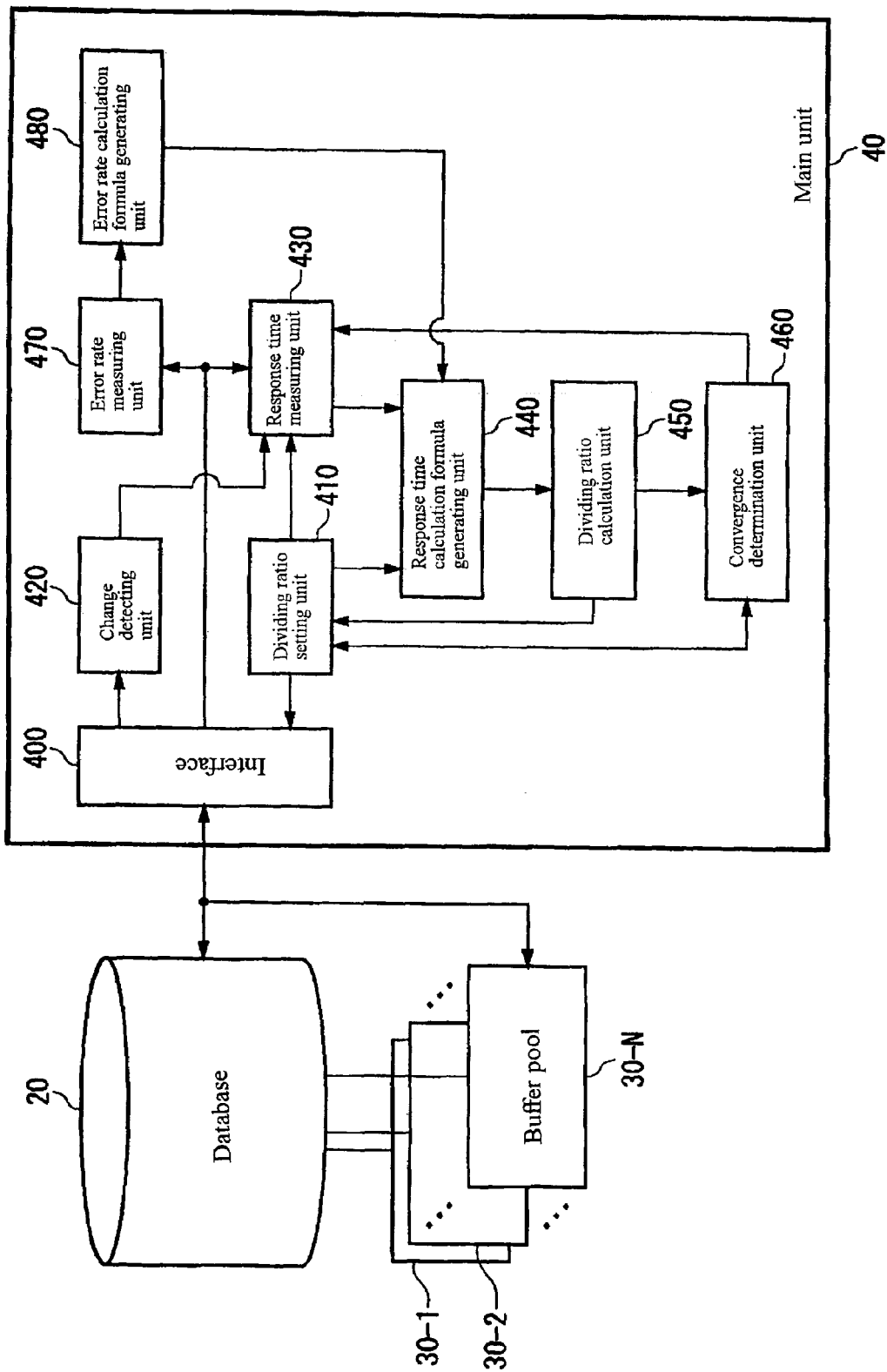

[Figure 2]
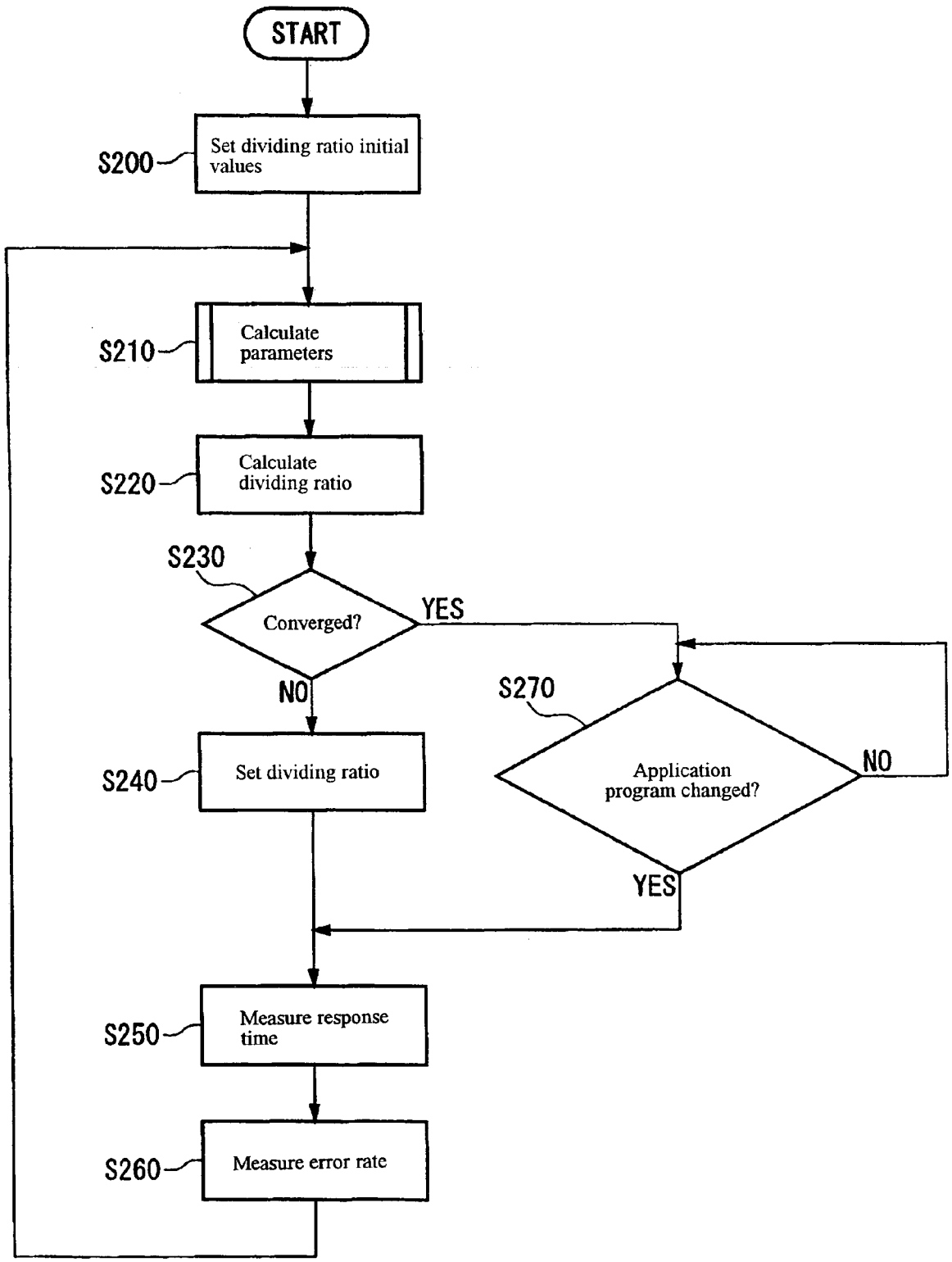

[Figure 3]
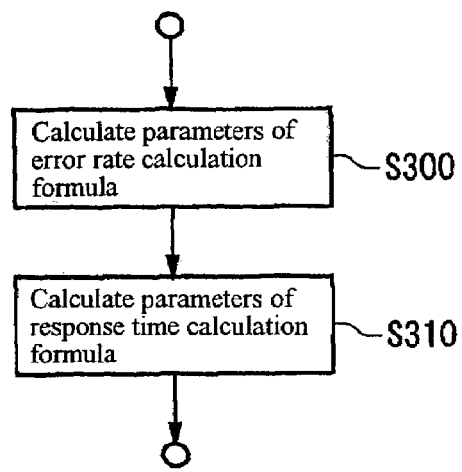
[Figure 4]
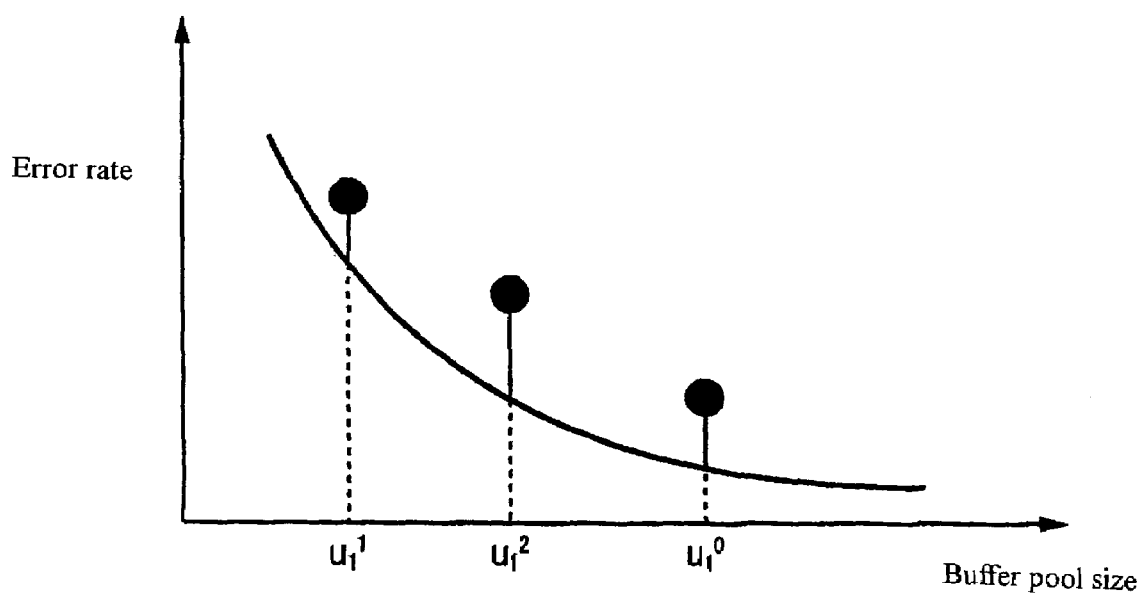

[Figure 5]
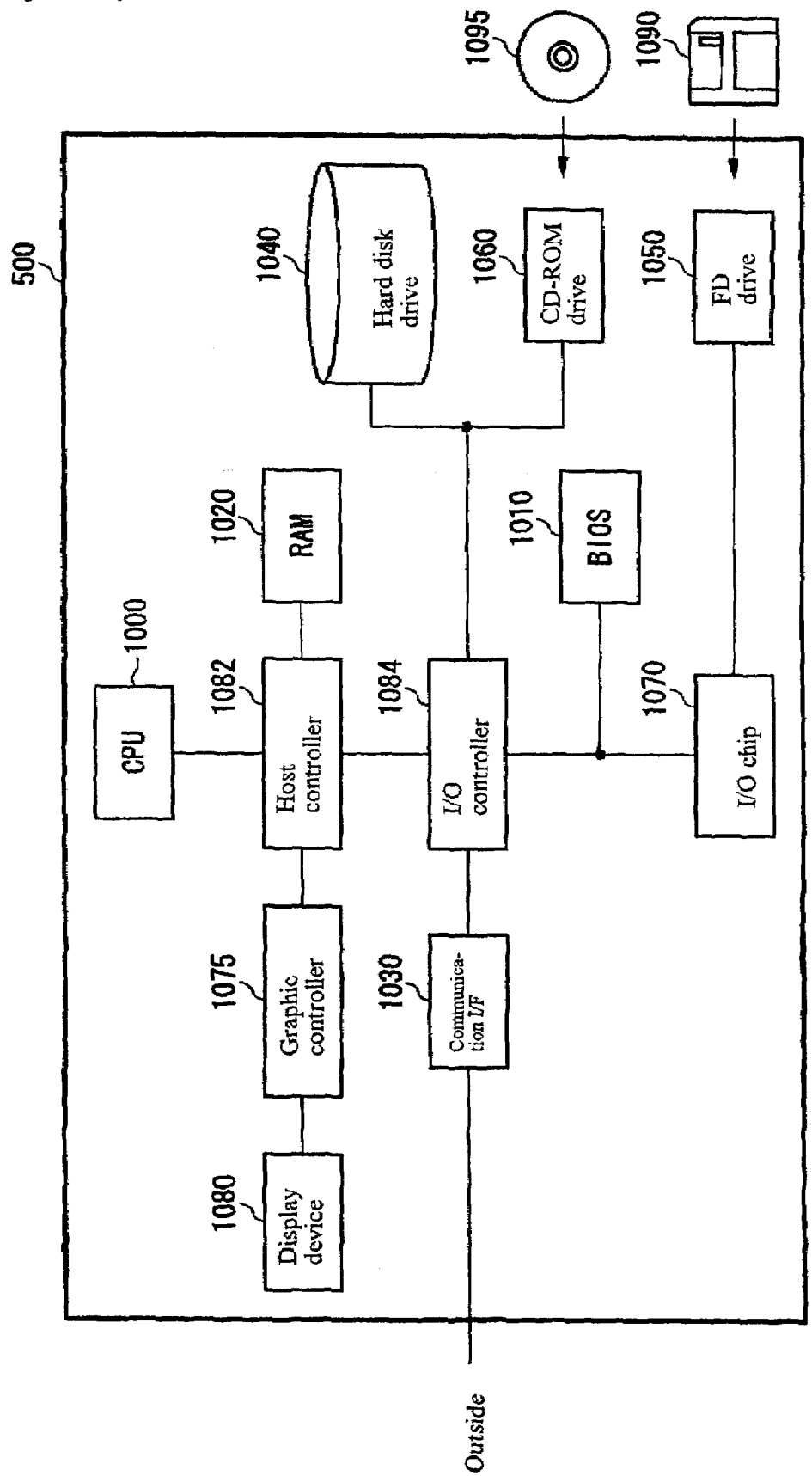

[Figure 6]

(a)

| WIPSb Start ||| 
|---|---|---|
| Dividing ratio initial values ||| 
| BP_Data | BP_Index | BP_Temp |
| 3.4 | 3.4 | 3.2 |
| 6 | 3 | 1 |
| 2 | 6 | 2 |
| Calculation results (six iterations) ||| 
| 3 | 2.4 | 4.6 |
| WIPSo Start ||| 
| Dividing ratio initial values ||| 
| 3 | 2.4 | 4.6 |
| 1 | 6 | 3 |
| 6 | 1 | 3 |
| Calculation results (three iterations) ||| 
| 5.4 | 0.6 | 4 |

(b)

| WIPSo Start ||| 
|---|---|---|
| Dividing ratio initial values ||| 
| BP_Data | BP_Index | BP_Temp |
| 3.4 | 3.4 | 3.2 |
| 1 | 6 | 3 |
| 6 | 1 | 3 |
| Calculation results (three iterations) ||| 
| 5.6 | 1.8 | 2.6 |
| WIPSb Start ||| 
| Dividing ratio initial values ||| 
| 5.6 | 1.8 | 2.6 |
| 6 | 3 | 1 |
| 2 | 6 | 2 |
| Calculation results (four iterations) ||| 
| 2.6 | 2.2 | 5.2 |

OPTIMIZATION OF BUFFER POOL SIZES FOR DATA STORAGE

FIELD OF THE INVENTION

The present invention relates to a database sever, program, recording medium, and control method that optimize the sizes of buffer pools for temporarily storing data from a database.

BACKGROUND ART

A method of providing a buffer pool on a database server for temporarily storing contents of a database for the purpose of increasing the speed of access to the database has been used. Ordinarily, the effect of increasing the access speed is higher in the case of providing a plurality of buffer pools on a database in correspondence with types of transaction than in the case of providing one buffer pool on the database.

In a case where the total size of a memory area usable as a buffer pool is determined, there is a need to set a dividing ratio by which the memory area is divided into a plurality of buffer pools to a suitable value. However, it is difficult to calculate a dividing ratio at which the access speed is maximized. Further, in some cases of access to a database, it is preferable to dynamically change the dividing ratio, depending on characteristics of access.

The following documents are considered:

[Patent Document 1]
Published Unexamined Patent-Application No. 9-330256
[Non-Patent Document 1]
Y. Diao et al., "Generic Online Optimization of Multiple Configuration Parameters With Application to a Database Server", pp. 3-15, Lecture Notes in Computer Science 2867, Springer, 2003.

In view of these problems, a method has been proposed in which the dividing ratio is calculated by substituting statistical information such as a record of use of a buffer pool in a predetermined mathematical expression (see Patent Document 1). In this method, the mathematical expression is determined in advance on the basis of user's experience, knowledge and the like.

Another method has been proposed in which the dividing ratio is determined on the basis of a direct search method (see Non-Patent Document 1). In this method, a plurality of dividing ratios different from each other are first set on the basis of a search algorithm, and an average response time is measured. The same steps are repeated to make a plurality of dividing ratio settings and measure average response with respect to the dividing ratio settings until a minimum average response time is obtained.

The following problems are to be solved by the invention:

According to Patent Document 1, it is difficult to set a suitable mathematical expression by supposing all possible access patterns. Moreover, in some cases where the pattern of access to a database is changed, it is unsuitable to continue using the same mathematical expression. For this reason, it is thought to be difficult to apply one mathematical expression to a general-purpose database server capable of processing according to various requirements.

According to Non-Patent Document 1, many candidates exist for the next dividing ratios to be set after measurement of one average response time. It is difficult to set suitable dividing ratios by selecting from the candidates by a small number of searches.

SUMMARY OF THE INVENTION

It is, therefore, an object of the present invention to provide a database server, program, recording medium and control method as a solution to the above-described problems. This object can be attained by a combination of features described in the independent claims in the appended claims. In the dependent claims, further advantageous examples of the present invention are specified.

This is achieved by the present invention providing a database server that optimizes the sizes of buffer pools for temporarily storing data from a database. The database server has a dividing ratio setting unit for setting a dividing ratio for dividing a memory area of a predetermined size into a plurality of the buffer pools used selectively according to the type of a transaction or the type of data, a response time measuring unit for measuring the response time that elapses between the issuance of a request for a plurality of transactions to the database server and the completion of processing of the plurality of transactions with the dividing ratio being set, a response time calculation formula generating unit for calculating parameters of a response time calculation formula for calculating the response time based on the size of each of the plurality of buffer pools from the set dividing ratio and the measured response time, and a dividing ratio calculation unit for calculating the dividing ratio that minimizes the response time by using the response time calculation formula the parameters of which are calculated by the response time calculation formula generating unit, wherein the dividing ratio setting unit sets the dividing ratio calculated by the dividing ratio calculating unit, a control method and a program for controlling the database server, and a recording medium on which the program is recorded. Thus, the present invention allows the sizes of buffer pools for temporarily storing data from a database to be dynamically optimized.

Not all the necessary features of the invention are listed. Subcombinations of the features can also constitute the present invention. The present invention allows the sizes of buffer pools for temporarily storing data from a database to be dynamically optimized.

DESCRIPTION THE INVENTION

The present invention provides a database server, program, recording medium and control method as a solution to the above-described problems. In a first form, the present invention provides a database server that optimizes the sizes of buffer pools for temporarily storing data from a database. The database server has a dividing ratio setting unit for setting a dividing ratio for dividing a memory area of a predetermined size into a plurality of the buffer pools used selectively according to the type of a transaction or the type of data, a response time measuring unit for measuring the response time that elapses between the issuance of a request for a plurality of transactions to the database server and the completion of processing of the plurality of transactions with the dividing ratio being set, a response time calculation formula generating unit for calculating parameters of a response time calculation formula for calculating the response time based on the size of each of the plurality of buffer pools from the set dividing ratio and the measured response time, and a dividing ratio calculation unit for calculating the dividing ratio that minimizes the response time by using the response time calculation formula the parameters of which are calculated by the response time calculation formula generating unit. The dividing ratio setting unit sets the dividing ratio calculated by the dividing ratio calculating unit, a control method and a program for controlling the database server, and a recording medium on which the program is recorded. Thus, the present invention allows the sizes of buffer pools for temporarily storing data from a database to be dynamically optimized.

Now, the present invention will be described with respect to an embodiment thereof. The embodiment described below, however, does not limit the invention. Not all combinations of features described in the description of the embodiment are necessarily indispensable to the solution according to the present invention.

FIG. 1 is a block diagram of a database server 10. The database server 10 has a database 20, buffer pools 30-1 to 30-N, and a main unit 40. The database server 10 is arranged for the purpose of dynamically optimizing the dividing ratio by which a memory area of a predetermined size is divided into the buffer pools 30-1 to 30-N by following changes in the tendency of access to the database 20.

In response to a request for a transaction from the outside, the database 20 reads out and sends back stored contents. The buffer pools 30-1 to 30-N are formed by dividing a memory area of a predetermined size. Each of the buffer pools 30-1 to 30-N temporarily stores contents of the database 20 read out from the database 20. Thus, the database server 10 can operate efficiently by obtaining data from some of the buffer pools 30-1 to 30-N required for a transaction when the transaction is requested, in comparison with processing for obtaining the corresponding data from the database 20.

Preferably, the buffer pools 30-1 to 30-N are selectively used according to the type of transaction. That is, each of the buffer pools 30-1 to 30-N stores data required for a type of transaction determined in correspondence with the buffer pool. Alternatively, the buffer pools 30-1 to 30-N may be selectively used according to the type of data to be stored. That is, each of the buffer pools 30-1 to 30-N stores a type of data in the database 20 determined in correspondence with the buffer pool.

The database server 10 is capable of changing the number of buffer pools. The upper limit of the number of buffer pools is determined on the basis of a software specification, a hardware specification or the like for implementation of the database server 10. The following description will be made by assuming, for ease of description, that the database server 10 has buffer pools 30-1 to 30-3.

The main unit 40 includes an interface 400, a dividing ratio setting unit 410, a change detecting unit 420, a response time measuring unit 430, a response time calculation formula generating unit 440, a dividing ratio calculation unit 450, a convergence determination unit 460, an error rate measuring unit 470, and an error rate calculation formula generating unit 480.

The dividing ratio setting unit 410 sets a dividing ratio by which a memory area of a predetermined size is divided into a plurality of buffer pools. For example, in a case where no dividing ratio has been calculated by the dividing ratio calculation unit 450, the dividing ratio setting unit 410 sets a predetermined dividing ratio. In a case where a dividing ratio has been calculated by the dividing ratio calculation unit 450, the dividing ratio setting unit 410 sets the calculated dividing ratio. For example, the dividing ratio setting unit 410 may perform processing to set a dividing ratio by using a program driven by a CIMOM (CIM Object Manager) for a CIM (Common Information Model).

The change detecting unit 420 performs detection as to whether or not an application program for access to the database 20 has been changed. The application program is not limited to a piece of software formed of one program. It may be one of a plurality of processing routines of one program.

The response time measuring unit 430 measures the response time from issuance of a request for a plurality of transactions on the database 20 to the completion of processing of the plurality of transactions in a state where the dividing ratio has been set by the dividing ratio setting unit 410. The response time measuring unit 430 may measure the response time each time the dividing ratio is changed by the dividing ratio setting unit 410, may measure the response time when receiving a command from the convergence determination unit 460, and may measure the response time when the application program is changed. For example, the response time measuring unit 430 may perform processing to measure the response time by a CIM provider.

The response time calculation formula generating unit 440 calculates, on the basis of the set dividing ratio and the measured response time, parameters of a response time calculation formula for calculating the response time on the basis of the sizes of the plurality of buffer pools. The response time calculation formula generating unit 440 may further perform, in addition to this calculation, a calculation of the parameters based on an error rate calculation formula generated by the error rate calculation formula generating unit 480. The dividing ratio calculation unit 450 calculates the dividing ratio at which the response time is minimized based on the response time calculation formula, the parameters of which are calculated by the response time calculation formula generating unit 440.

The convergence determination unit 460 calculates the difference between the first dividing ratio that is the dividing ratio already set by the dividing ratio setting unit 410 and the second dividing ratio that is the dividing ratio calculated by the dividing ratio calculation unit 450 in a state where the first dividing ratio is set. The convergence determination unit 460 makes a determination as to whether the difference has converged to a value equal to or smaller than a predetermined reference difference value. If the difference has not converged to a value equal to or smaller than the predetermined reference difference value, the dividing ratio calculation unit 450 sends a command to the dividing ratio setting unit 410 and the response time measuring unit 430. Receiving this command, the dividing ratio setting unit 410 sets the second dividing ratio, and the response time measuring unit 430 measures the response time in a state where the second dividing ratio is set.

The error rate measuring unit 470 measures, with respect to each buffer pool, an error rate representing the frequency of failure to store data in the buffer pool at an access request for storing the data in the buffer pool. Further, the error rate measuring unit 470 obtains the set dividing ratio. The error rate calculation formula generating unit 480 calculates, on the basis of the error rate and the dividing ratio, parameters of the error rate calculation formula for calculating the error rate of each buffer pool on the basis of the size of the buffer pool.

FIG. 2 shows the flow of operation of a process in which the database server 10 sets dividing ratios. If no dividing ratio has been set by the dividing ratio calculation unit 450, the dividing ratio setting unit 410 sets a dividing ratio initial value (S200). More specifically, the dividing ratio setting unit 410 sets one after another a plurality of predetermined dividing ratios different from each other. The response time measuring unit 430 measures the response time with respect to setting of each of the plurality of dividing ratios. The sets of the sizes of the buffer pools and response times thereby obtained are expressed by the following expression (1):

[Formula 1]

$$\text{splitting ratio } 1\{r_0, u_1^0, u_2^0, u_3^0\}$$
$$\text{splitting ratio } 2\{r_1, u_1^1, u_2^1, u_3^1\}$$
$$\text{splitting ratio } 3\{r_3, u_1^2, u_2^2, u_3^2\} \quad (1)$$

In expression (1), u represents the size of each buffer pool, and r represents the response time. That is, the sizes of the buffer pools 30-1, the buffer pools 30-2 and the buffer pools 30-3 are $u_1$, $u_2$ and $u_3$, respectively. The response time calculation formula generating unit 440 calculates the parameters of the response time calculation formula in the case where the plurality of dividing ratios are set successively, on the basis of each of the plurality of dividing ratios and the response time when the dividing ratio is set (S210).

This processing will be described in detail. A model is assumed in which the response time is determined by expression (2) using the buffer pool sizes as an input. That is, expression (2) is an example of the response time calculation formula in accordance with the present invention. In this expression, r(t) represents the average response time in the time period from a time tT to a time (t+1)T. T is a predetermined constant. Also, u(t) represents the sizes of the buffer pools set in the time period from time tT to time (t+1)T. C(t) is a noise term.

[Formula 2]

$$r(t) = \sum_{i=1}^{n} a_i e^{-b_i u_i(t)} + c(t) \quad (2)$$

The response time calculation formula generating unit 440 calculates a parameter $a_i$ representing the influence of each buffer pool on the response time on the basis of the dividing ratio and the response time. The response time calculation formula generating unit 440 also calculates a parameter $b_i$ representing the influence of the size of each buffer pool on the response time in the case of access to data to be stored in the buffer pool. The response time calculation formula is not limited to expression (2). For example, the response time calculation formula may be any function such that the response time decreases with the increase in buffer size. To suitably express the behavior of the buffer pools, it is desirable to form the response time calculation formula as a nonlinear decreasing exponential function.

Description will next be made of a process in which the response time calculation formula generating unit 440 calculates the parameters of the response time calculation formula on the basis of an extended Kalman filter. The vector of the parameters to be calculated is shown by expression (3). The response time calculation formula generating unit 440 calculates $x_t$ from $x_{t-1}$ by expressions (4). That is, the response time calculation formula generating unit 440 successively calculates $x_t$ from $x_1$ until the difference between $x_{t-1}$ and $x_t$ converges to a value equal to or smaller than a predetermined reference difference value.

The elements of $x_t$ when the difference converges are the parameters to be obtained. Expressions (5) and (6) are used for definition of expressions (4).

[Formula 3]

$$x_t = [a_{1,t} \ a_{2,t} \ a_{3,t} \ b_{1,t} \ b_{2,t} \ b_{3,t}]^T \quad (3)$$

[Formula 4]

$$x_t = x_{t-1} + K_t[r_{(t \bmod 3)} - h_t(x_{t-1})],$$
$$K_t = P_{t-1} H_t^T [H_t P_{t-1} H_t^T + 1]^{-1},$$
$$P_t = P_{t-1} - K_t H_t P_{t-1}, \quad (4)$$

[Formula 5]

$$h_t(x_{t-1}) = a_{1,t-1} e^{-b_{1,t-1} u_1^{t \bmod 3}} + a_{2,t-1} e^{-b_{2,t-1} u_2^{t \bmod 3}} + a_{3,t-1} e^{-b_{3,t-1}(B - u_1^{t \bmod 3} - u_2^{t \bmod 3})} \quad (5)$$

[Formula 6]

$$H_t = \left[ e^{-b_{1,t} u_1^{t \bmod 3}} \ e^{-b_{2,t} u_2^{t \bmod 3}} \ e^{-b_{3,t}(B - u_1^{t \bmod 3} - u_2^{t \bmod 3})} \ \ldots \ -u_1^{t \bmod 3} a_{1,t} e^{-b_{1,t} u_1^{t \bmod 3}} \ -u_2^{t \bmod 3} a_{2,t} e^{-b_{2,t} u_2^{t \bmod 3}} \ -(B - u_1^{t \bmod 3} - u_2^{t \bmod 3}) a_{3,t} e^{-b_{3,t}(B - u_1^{t \bmod 3} - u_2^{t \bmod 3})} \right]^T \quad (6)$$

If four or more sets of the response time and the dividing ratio are obtained, it is necessary to change t mod 3 in the above to t mod 4, t mod 5 and so on. The above-described method of calculating the parameters based on an extended Kalman filter is not exclusively used. It is known that H-infinity filtering, for example, can be regarded as Kalman filtering in a Krein space. Therefore, the response time calculation formula generating unit 440 may calculate the parameters by an estimation algorithm using H-infinity filtering.

According to another method, the response time calculation formula generating unit 440 may further calculate the parameters on the basis of the error rate of each buffer pool. This method will be described below with reference to FIGS. 3 and 4. Subsequently, the dividing ratio calculation unit 450 calculates the dividing ratio at which the response time is minimized on the basis of the response time calculation formula, the parameters of which have been calculated by the response time calculation formula generating unit 440 (S220). Details of this processing will be described by using the model shown by expression (2) above.

First, the response time calculation formula is expressed as expression (7) by using the parameters obtained in S210.

[Formula 7]

$$\hat{r}(t) = \sum_{i=1}^{n} \hat{a}_i e^{-\hat{b}_i u_i(t)} \quad (7)$$

Therefore, the dividing ratio calculation unit 450 can calculate, for example by using a gradient method, $u_i$ at which the response time is minimized if this model is assumed to be correct. More specifically, the dividing ratio calculation unit 450 successively calculates $u_k$ from $u_{k-1}$ by using expressions (8) until the difference value between $u_{k-1}$ and $u_k$ converges within a predetermined range. In expression (8), μ is a predetermined arbitrary positive number. "Minimizing" does not necessarily denote strict minimization to the minimum value but denotes successively calculating dividing ratios by which the response time is brought closer to the minimum value.

[Formula 8]

$$u_{k+1} = u_k - \mu h_k,$$
$$u_k = [u_{1,k} \ u_{2,k}]^T$$
$$h_k = \left[-\hat{a}_1 \hat{b}_1 e^{-\hat{b}_1 u_{1,k}} + \hat{a}_3 \hat{b}_3 e^{-\hat{b}_3 (B-u_{1,k}-u_{2,k})} - \hat{a}_2 \hat{b}_2 e^{-\hat{b}_2 u_{2,k}} + \hat{a}_3 \hat{b}_3 e^{-\hat{b}_3 (B-u_{1,k}-u_{2,k})}\right]^T \quad (8)$$

Subsequently, the convergence determination unit 460 calculates the value of the difference between the first dividing ratio that is the dividing ratio already set by the dividing ratio setting unit 410 and the second dividing ratio that is the dividing ratio calculated by the dividing ratio calculation unit 450 (S230). The convergence determination unit 460 then makes a determination as to whether or not the difference value has converged to a value equal to or smaller than the reference difference value. More specifically, the convergence determination unit 460 may make a determination as to whether or not the difference value with respect to one of the buffer pools has converged to a value equal to or smaller than the reference difference value or whether or not the difference value with respect to all the buffer pools has converged to a value equal to or smaller than the reference difference value.

If the value of the difference between the first dividing ratio and the second dividing ratio has not converged to a value equal to or smaller than the reference difference value (S230: NO), the dividing ratio setting unit 410 sets the second dividing ratio calculated by the dividing ratio calculation unit 450 (S240). The response time measuring unit 430 measures the response time in a state where the second dividing ratio is set (S250). Further, in this state, the error rate measuring unit 470 may measure the error rate of each buffer pool (S260). The error rate measuring unit 470 may measure a different index necessary for calculation of the error rate instead of performing processing for immediately calculating the error rate.

Subsequently, the database server 10 returns the process to S210. Processing in the case where the process moves from S260 to S210 will be described. First, the response time calculation formula generating unit 440 calculates the parameters of the response time calculation formula on the basis of the second dividing ratio and the response time in the case where the second dividing ratio is set (S210). Preferably, the response time calculation formula generating unit 440 calculates the parameters of the response time calculation formula on the basis of the first dividing ratio and the response time in the case where the first dividing ratio is set and on the basis of the second dividing ratio and the response time in the case where the second dividing ratio is set.

More preferably, the response time calculation formula generating unit 440 calculates the parameters of the response time calculation formula by a calculation method such that the response time measured later affects the parameters of the response time calculation formula more largely than the response time measured earlier. For example, the response times may be successively arranged as $r_1, r_2, r_3, \ldots$ in the order in which they are measured, and the response time calculation formula generating unit 440 may calculate the parameters by using expression (9) instead of expression (4). In expression, k is a predetermined value larger than 0 and smaller than 1.

[Formula 9]

$$x_t = x_{t-1} + K_t[r_{(t \bmod 3)} - h_t(x_{t-1})], \quad (9)$$
$$K_t = P_{t-1} H_t^T [H_t P_{t-1} H_t^T + \lambda]^{-1},$$
$$P_t = \frac{1}{\lambda}[P_{t-1} - K_t H_t P_{t-1}],$$

The dividing ratio calculation unit 450 then calculates a third dividing ratio at which the response time is minimized on the basis of the response time calculation formula, the parameters of which have been calculated by the response time calculation formula generating unit 440 (S220). The convergence determination unit 460 determines whether or not the value of the difference between the second dividing ratio and the third dividing ratio has converged to a value equal to or smaller than the reference difference value (S230). If the difference value has not converged (S230: NO), the dividing ratio setting unit 410 sets the third dividing ratio (S240). Thus, the database server 10 iterates alternately performing the measurement of the response time and the calculation of the dividing ratio until the dividing ratio converges.

When the dividing ratio converges (S230: YES), the database server 10 suspends processing until the application program for access to the database 20 is changed (S270: NO). For example, the change detecting unit 420 may determine that the application program has been changed in a case where the ratio of some of the plurality of types of transactions requested on the database 20 changes so as to exceed a predetermined reference value. If the application program is changed (S270: YES), the database server 10 moves the process to S250 and other subsequent steps, and the response time measuring unit 430 measures the response time (S250).

Thus, the database server 10 can dynamically calculate and set the suitable dividing ratio not only in a case where there is a need to newly set the dividing ratio but also in a case where the application program has been changed. Processing for changing the dividing ratio on condition that the application program is changed is only an example. Instead of performing this processing, the database server 10 may continue alternately performing the measurement of the response time and the calculation of the dividing ratio regardless of whether or not the application program has been changed.

FIG. 3 shows another example of calculation of the parameters in S210 shown in FIG. 2. In this example, the dividing ratio computing unit 450 further calculates the parameters of the response time calculation formula on the basis of the error rate. More specifically, the error rate calculation formula generating unit 480 calculates, on the basis of the measured error rate and the set dividing ratio, the parameters of the error rate calculation formula for calculating the error rate of each buffer pool on the basis of the size of each buffer pool (S300).

The error rate is a value defined by expression (10) shown below. Data Physical Reads represents the number of times a data portion in the database 20 is read out or the amount of data read out. Data Logical Reads represents the number of times a data portion in the database 20 should be read out according to a request or the amount of data to be read out according to the request. Similarly, Index Physical Reads represents the number of times an index portion in the database 20 is read out or the amount of data read out. Index Logical Reads represents the number of times a data portion in the database 20 should be read out according to a request or the amount of data to be read out according to the request.

[Formula 10]

$$\text{Error rate} = \frac{\text{Data Physical Reads} + \text{Index Physical Reads}}{\text{Data Logical Reads} + \text{Index Logical Reads}} \quad (10)$$

That is, the error rate measuring 470 may calculate the error rate, for example, on the basis of Data Physical Reads, Data Logical Reads, Index Physical Reads and Index Logical Reads. The error rate has such a characteristic as to become lower if the size of the buffer pool is increased. Therefore, the error rate calculation formula for calculating the error rate on the basis of the buffer pools can be represented by a model such as expression (11), in which u(t) denotes the size of each buffer pool.

[Formula 11]

$$\text{Error rate} = e^{-b_j u_j(t)} \quad (11)$$

The error rate calculation formula generating unit 480 computes a parameter b which indicates the degree of influence of the buffer pool size on the error rate. For example, the error rate calculation formula generating unit 480 calculates the parameter b by a constrained least squares method with a restriction such that the parameter b is a positive value, on the basis of each of a plurality of buffer pool sizes different from each other and a hit rate measured in a state where the size of the buffer pool is set.

FIG. 4 is a diagram showing the concept of the process in which the database server 10 calculates the parameters of the error rate calculation formula. In the graph of this figure, the response time is plotted with respect to a plurality of buffer pool sizes different from each other. According to the concept, the error rate calculation formula generating unit 480 computes the parameter b minimizing the distance between each of these plotted points and the graph indicated by expression (11).

Returning to FIG. 3, the response time calculation formula generating unit 440 subsequently calculates a parameter of the response time calculation formula on the basis of the computed parameter b (S310). For example, the response time calculation formula generating unit 440 calculates a parameter a on the basis of expression (12) shown below by a constrained least squares method with a restriction such that the parameter a is a positive value. Each parameter b in this expression (12) is the parameter already calculated in S300.

[Formula 12]

$$\begin{bmatrix} r_0 \\ r_1 \\ r_2 \end{bmatrix} = \begin{bmatrix} e^{-\hat{b}_1 u_1^0} & e^{-\hat{b}_2 u_2^0} & e^{-\hat{b}_3 u_3^0} \\ e^{-\hat{b}_1 u_1^1} & e^{-\hat{b}_2 u_2^1} & e^{-\hat{b}_3 u_3^1} \\ e^{-\hat{b}_1 u_1^2} & e^{-\hat{b}_2 u_2^2} & e^{-\hat{b}_3 u_3^2} \end{bmatrix} \begin{bmatrix} a_1 \\ a_2 \\ a_3 \end{bmatrix} \quad (12)$$

According to the method shown in this figure, the response time calculation formula generating unit 440 can calculate the parameters of the response time calculation formula more accurately. The calculation time is thereby reduced with respect to one iterating cycle, thus enabling the dividing ratio to converge faster.

FIG. 5 shows an example of the hardware configuration of a computer 500 which functions as the main unit 40. The computer 500 has a CPU peripheral section having a CPU 1000, a RAM 1020 and a graphic controller 1075 connected to each other by a host controller 1082, an input/output section having a communication interface 1030, a hard disk drive 1040 and a CD-ROM drive 1060 connected to the host controller 1082 by an input/output controller 1084, and a legacy input/output section having a BIOS 1010, a flexible disk drive 1050 and an input/output chip 1070 connected to the input/output controller 1084.

The host controller 1082 connects the RAM 1020, and the CPU 1000 and the graphic controller 1075, which access the RAM 1020 at a high transfer rate. The CPU 1000 operates on the basis of programs stored in the BIOS 1010 and the RAM 1020, and controls each component. The graphic controller 1075 obtains image data generated, for example, by the CPU 1000 on a frame buffer provided in the RAM 1020, and displays the image data on a display device 1080. Alternatively, the graphic controller 1075 may contain therein a frame buffer for storing image data generated by the CPU 1000 for example.

The input/output controller 1084 connects the host controller 1082, the communication interface 1030, which is an input/output device of a comparatively high speed, the hard disk drive 1040 and the CD-ROM drive 1060. The communication interface 1030 performs communication with an external unit via a network. The hard disk drive 1040 stores programs and data used by the computer 500. The CD-ROM drive 1060 reads a program or data from a CD-ROM 1095 and provides the read program or data to the input/output chip 1070 via the RAM 1020.

To the input/output controller 1084, the BIOS 1010 and input/output devices of a comparatively low speed, i.e., the flexible disk drive 1050 and the input/output chip 1070 or the like are also connected. The BIOS 1010 stores programs including a boot program executed by the CPU 1000 at the time of startup of the computer 500 and programs dependent on the hardware of the computer 500. The flexible disk drive 1050 reads a program or data from a flexible disk 1090 and provides the read program or data to the input/output chip 1070 via the RAM 1020. The input/output chip 1070 connects the flexible disk 1090 and various input/output devices, for example, through a parallel port, a serial port, a keyboard port, a mouse port, etc.

A program provided to the computer 500 is provided by a user in a state of being stored on a recording medium, such as the flexible disk 1090, the CD-ROM 1095, or an IC card. The program is readout from the recording medium, installed in the computer 500 via the input/output chip 1070 and/or the input/output controller 1084, and executed in the computer 500. Operations which the computer 500 is made by this program to perform are the same as the operations in the computer 500 described above with reference to FIGS. 1 to 4. Therefore, description of the operations will not be repeated.

The above-described program may be stored on an external storage medium. As the recording medium, an optical recording medium such as a DVD or a PD, a magneto-optic recording medium such as an MD, a tape medium, a semiconductor memory such as an IC card, or the like can be used as well the flexible disk 1090 and the CD-ROM 1095. Also, a storage device such as a hard disk or a RAM provided in a server system connected to a special-purpose communication network or the Internet may be used as the recording medium to provide the program to the computer 500 via the network.

FIG. 6 is a diagram showing the effects of this embodiment. An experiment was conducted by executing in the database server 10 a TPC-W (Transaction Processing Performance Council) bench mark test to evaluate the performance on the database with respect to OLTP (Online Transaction Processing). On the database 20, a load which is called WIPSo in TPC-W and in which each of the ratios of browses and orders is set to 50% is imposed. Also on the database 20, a load which is called WIPSb and in which the ratio of a browses is 95% and the ratio of orders is 5% is imposed.

The number of buffer pools is three. Each buffer pool is set in correspondence with a predetermined transaction using the buffer pool. More specifically, a transaction in which index portions are mainly referred to is associated with the buffer pool having an identifier BP_Index. A transaction in which cached at a such as work data is mainly referred to is associated with the buffer pool having an identifier BP_Temp. A transaction in which other data is mainly referred to is associated with the buffer pool having an identifier BP_Data. The response time is a value obtained by averaging the response time over a unit time of fifteen minutes in transactions.

FIG. 6(a) shows the dividing ratio set by the database server 10 in a case where the load imposed on the database 20 is changed from WIPSb to WIPSo. The database server 10 first sets dividing ratio initial values of 3.4:3.4:3.2, 6:3:1 and 2:6:2 one after another and measures the response time with respect to each of these dividing ratio settings. Subsequently, the database server 10 calculates the parameters of the response time calculation formula on the basis of these sets of the dividing ratio and the response time. The parameters were iteratively calculated six times before convergence of the dividing ratio. Consequently, the database server 10 sets 3:2.4:4.6 as the dividing ratio.

Subsequently, the WIPSo load is imposed on the database 20. The response time in the state where the dividing ratio 3:2.4:4.6 is set has already been measured. Further, the database server 10 sets dividing ratio initial values of 1:6:3 and 6:1:3 successively and measures the response time with respect to each of these dividing ratio settings. And then, the database server 10 calculates the parameters of the response time calculation formula on the basis of these sets of the dividing ratio and the response time. The parameters were iteratively calculated three times before convergence of the dividing ratio. Consequently, the database server 10 sets 5.4:0.6:4 as the dividing ratio.

FIG. 6(b) shows the dividing ratio set by the database server 10 in a case where the load imposed on the database 20 is changed from WIPSo to WIPSb. The database server 10 first sets dividing ratio initial values of 3.4:3.4:3.2, 1:6:3 and 6:1:3 one after another and measures the response time with respect to each of these dividing ratio settings.

Subsequently, the database server 10 calculates the parameters of the response time calculation formula on the basis of these sets of the dividing ratio and the response time. The parameters were iteratively calculated three times before convergence of the dividing ratio. Consequently, the database server 10 sets 5.6:1.8:2.6 as the dividing ratio. Subsequently, the WIPSb load is imposed on the database 20. The response time in the state where the dividing ratio 5.6:1.8:2.6 is set has already been measured. Further, the database server 10 sets dividing ratio initial values of 6:3:1 and 2:6:2 successively and measures the response time with respect to each of these dividing ratio settings. Subsequently, the database server 10 calculates the parameters of the response time calculation formula with on the basis of these sets of the dividing ratio and the response time. The parameters were iteratively calculated four times before convergence of the dividing ratio. Consequently, the database server 10 sets 2.6:2.2:5.2 as the dividing ratio.

It has been confirmed that the dividing ratio thereby set is substantially the same as those set by the other methods of calculating the dividing ratio requiring 10 hours or longer. That is, according to the present invention, a suitable dividing ratio according to a load can be calculated in a short time even if the load is changed.

While the present invention has been described with respect to the embodiment thereof, the technical scope of the present invention is not limited to the scope described above with respect to the embodiment. It is apparent to those skilled in the art that various changes and modifications can be made in the above-described embodiment. It is apparent from the description in the appended claims that other embodiments of the invention provided by making such changes and modifications are also included in the technical scope of the present invention. Variations described for the present invention can be realized in any combination desirable for each particular application. Thus particular limitations, and/or embodiment enhancements described herein, which may have particular advantages to a particular application need not be used for all applications. Also, not all limitations need be implemented in methods, systems and/or apparatus including one or more concepts of the present invention.

The present invention can be realized in hardware, software, or a combination of hardware and software. A visualization tool according to the present invention can be realized in a centralized fashion in one computer system, or in a distributed fashion where different elements are spread across several interconnected computer systems. Any kind of computer system—or other apparatus adapted for carrying out the methods and/or functions described herein—is suitable. A typical combination of hardware and software could be a general purpose computer system with a computer program that, when being loaded and executed, controls the computer system such that it carries out the methods described herein. The present invention can also be embedded in a computer program product, which comprises all the features enabling the implementation of the methods described herein, and which—when loaded in a computer system—is able to carry out these methods.

Computer program means or computer program in the present context include any expression, in any language, code or notation, of a set of instructions intended to cause a system having an information processing capability to perform a particular function either directly or after conversion to another language, code or notation, and/or reproduction in a different material form.

Thus the invention includes an article of manufacture which comprises a computer usable medium having computer readable program code means embodied therein for causing a function described above. The computer readable program code means in the article of manufacture comprises computer readable program code means for causing a computer to effect the steps of a method of this invention. Similarly, the present invention may be implemented as a computer program product comprising a computer usable medium having computer readable program code means embodied therein for causing a function described above. The computer readable program code means in the computer program product comprising computer readable program code means for causing a computer to effect one or more functions of this invention. Furthermore, the present invention may be implemented as a program storage device readable by machine, tangibly embodying a program of instructions executable by the machine to perform method steps for causing one or more functions of this invention.

It is noted that the foregoing has outlined some of the more pertinent objects and embodiments of the present invention. This invention may be used for many applications. Thus, although the description is made for particular arrangements and methods, the intent and concept of the invention is suitable and applicable to other arrangements and applications. It will be clear to those skilled in the art that modifications to the disclosed embodiments can be effected without departing from the spirit and scope of the invention. The described embodiments ought to be construed to be merely illustrative of some of the more prominent features and applications of the invention. Other beneficial results can be realized by applying the disclosed invention in a different manner or modifying the invention in ways known to those familiar with the art.

What is claimed is:

1. A database server that optimizes the sizes of buffer pools for temporarily storing data from a database, comprising:
    a dividing ratio setting unit setting a dividing ratio for dividing a memory area of a predetermined size into a plurality of said buffer pools used selectively according to the type of a transaction;
    a response time measuring unit measuring the response time that elapses between the issuance of a request for a plurality of transactions to said database server and the completion of processing of said plurality of transactions with said dividing ratio being set;
    a response time computation formula generating unit calculating parameters of a response time calculation formula for calculating said response time based on the size of each of said plurality of buffer pools from said set dividing ratio and said measured response time, wherein the response time calculation formula is $$r(t) = \sum_{i=1}^{n} a_i e^{-b_i u_i(t)} + c(t),$$

where r(t) represents an average response time in a time period from a time t to a time (t+1), $u_i(t)$ represents sizes of the plurality of the buffer pools set in the time period from t to time (t+1), c (t) is a noise term $a_i$ represents an influence of each buffer pool on the response time on a basis of the dividing ratio and the response time, and $b_i$ represents an influence of a size of each buffer pool on the res response time when accessing data to be stored in the buffer pool; and
    a dividing ratio calculation unit calculating said dividing ratio that minimizes said response time by using said response time calculation formula the parameters of which are calculated by said response time calculation formula generating unit;
    wherein said dividing ratio setting unit sets the dividing ratio calculated by said dividing ratio calculating unit.

2. The database server according to claim 1, further comprising a convergence determination unit for determining whether or not the difference between a first dividing ratio that is the dividing ratio already set by said dividing ratio setting unit and a second dividing ratio that is the dividing ratio calculated by said dividing ratio calculation unit in a state where the first dividing ratio is set has converge to a value equal to or smaller than a predetermined reference difference value,
    wherein if the difference between the first dividing ratio and the second dividing ratio does not converge to a value equal to or smaller than the reference difference value,
    said dividing ratio setting unit sets the second dividing ratio;
    said response time measuring unit measures the response time in a state where the second dividing ratio is set;
    said response time calculation formula generating unit calculates the parameters of the response time calculation formula on the basis of the second dividing ratio and the response time in the state where the second dividing ratio is set;
    said dividing ratio calculation unit calculates a third dividing ratio at which the response time is minimized, on the basis of the response time calculation formula the parameters of which are calculated by said response time calculation formula generating unit;
    said convergence determination unit determines whether or not the difference between the second dividing ratio and the third dividing ratio have converged to a value equal to or smaller than the reference difference value; and
    said dividing ratio setting unit sets the third dividing ratio if the difference between the second dividing ratio and the third dividing ratio does not converge to a value equal to or smaller than the reference difference value.

3. The database server according to claim 2, wherein in a case where the difference between the first dividing ratio and the second dividing ratio does not converge to a value equal to or smaller than the reference difference value,
    said response time calculation formula generating unit calculates the parameters of the response time calculation formula on the basis of the first dividing ratio and the response time in the case where the first dividing ratio is set and on the basis of the second dividing ratio and the response time in the case where the second dividing ratio is set.

4. The database server according to claim 3, wherein if the difference between the first dividing ratio and the second dividing ratio does not converge to a value equal to or smaller than the reference difference value, said response time calculation formula generating unit calculates the parameters of the response time calculation formula by a calculation method such that the response time measured later affects the parameters of the response time calculation formula more largely than the response time measured earlier.

5. The database server according to claim 1, wherein if the dividing ratio has not been calculated by said dividing ratio computation unit, said dividing ratio setting unit sets one after another a plurality of predetermined dividing ratios different from each other;

said response time measuring unit measures the response time with respect to each of the plurality of dividing ratio settings; and said response time calculation formula generating unit calculates the parameters of the response time calculation formula if the plurality of diving ratios are set in order, on the basis of each of the plurality of dividing ratios and the response time in the state where the dividing ratio is set.

6. The database server according to claim 1 being accessed by one of a plurality of application programs making requests for kinds of processing different from each other, the database server further comprising a change detecting unit for detecting whether or not the application program accessing the database server has been changed, and wherein if the application program has been changed,
said response time measuring unit measures the response time;
said response time calculation formula generating unit calculates the parameters of the response time calculation formula on the basis of the set dividing ratio and the response time;
said dividing ratio calculation unit calculates the dividing ratio at which the response time is minimized, on the basis of the response time calculation formula; and
said dividing ratio setting unit sets the dividing ratio calculated by said dividing ratio calculation unit.

7. The database server according to claim 6, wherein if the ratio of at least one of the plurality of types of transaction requested on said database changed so as to exceed a predetermined reference value, said change detecting unit determines that the application program has been changed.

8. The database server according to claim 1, wherein said response time calculation formula generating unit calculates a parameter representing the influence of each buffer pool on said response time and a parameter representing the influence of the size of each buffer pool on the response time in the case of access to data to be stored in the buffer pool, on the basis of the dividing ratio set by said dividing ratio setting unit and the response time in a state where the dividing ratio is set.

9. The database server according to claim 1, further comprising:
an error rate measuring unit for measuring, with respect to each buffer pool, an error rate representing the frequency of failure to store data in the buffer pool at an access request for storing the data in the buffer pool; and
an error rate computation formula generating unit for calculating, on the basis of the error rate and the dividing ratio, parameters of an error rate calculation formula for calculating the error rate of each buffer pool on the basis of the size of the buffer pool, wherein said response time calculation formula generating unit further calculates the parameters of the response time calculation formula on the basis of the parameters calculated by said error rate computation formula generating unit.

10. A computer program product, comprising: a tangible storage medium readable by a processing circuit and storing instructions for execution by the processing circuit for performing a method to optimize sizes of buffer pools for temporarily storing data from a database, said sizes being set in a database server, said method comprising steps of:

setting in said database server a dividing ratio for dividing a memory area of a predetermined size into a plurality of said buffer pools used selectively according to the type of a transaction;

measuring a response time that elapses between the issuance of a request for a plurality of transactions to said database server and the completion of processing of said plurality of transactions with said dividing ratio being set;

calculating parameters of a response time calculation formula for calculating said response time based on the size of each of said plurality of buffer pools from said set dividing ratio and said measured response time, wherein the response time calculation formula is $$r(t) = \sum_{i=1}^{n} a_i e^{-b_i u_i(t)} + c(t),$$

where r(t) represents an average response time in a time period from a time t to a time (t+1), $u_i(t)$ represents sizes of the plurality of the buffer pools set in the time period from t to time (t+1), c(t) is a noise term, $a_i$ represents an influence of each buffer pool on the response time on a basis of the dividing ratio and the response time, and $b_1$ represents an influence of a size of each buffer pool on the response time when accessing data to be stored in the buffer pool; and calculating said dividing ratio that minimizes said response time by using said response time calculation formula the parameters of which are calculated by said response time calculation formula generating unit;

wherein said dividing ratio setting unit sets the dividing ratio calculated by said dividing ratio calculating unit.

11. The computer program product according to claim 10, further comprising: determining whether or not the difference between a first dividing ratio that is the dividing ratio already set by said dividing ratio setting unit and a second dividing ratio that is the dividing ratio calculated by said dividing ratio calculation unit in a state where the first dividing ratio is set has converged to a value equal to or smaller than a predetermined reference difference value, wherein if the difference between the first dividing ratio and the second dividing ratio does not converge to a value equal to or smaller than the reference difference value, setting the second dividing ratio;

measuring the response time in a state where the second dividing ratio is set;

calculating the parameters of the response time calculation formula on the basis of the second dividing ratio and the response time in the state where the second dividing ratio is set;

calculating a third dividing ratio at which the response time is minimized, on the basis of the response time calculation formula the parameters;

determining whether or not the difference between the second dividing ratio and the third dividing ratio have converged to a value equal to or smaller then the reference difference value; and setting the third dividing ratio if the difference between the second dividing ratio and the third dividing ratio does not converge to a value equal to or smaller than the reference difference value.

12. A control method for controlling a database server that optimizes the sizes of buffer pools for temporarily storing data from a database, comprising:

a dividing ratio setting step to set a dividing ratio for dividing a memory area of a predetermined size into a plurality of said buffer pools used selectively according to the type of a transaction;

a response time measuring step to measure the response time that elapses between the issuance of a request for a plurality of transactions to said database server and the completion of processing of said plurality of transactions with said dividing ratio being set;

a response time computation formula generating step to calculate parameters of a response time calculation formula for calculating said response time based on the size of each of said plurality of buffer pools from said set dividing ratio and said measured response time, wherein the response time calculation formula is $$r(t) = \sum_{i=1}^{n} a_i e^{-b_i u_i(t)} + c(t),$$

where r(t) represents an average response time in a time period from a time t to a time (t+1), $u_i(t)$ represents sizes of the plurality of the buffer pools set in the time period from t to time (t+1), c(t) is a noise term, $a_i$ represents an influence of each buffer pool on the response time on a basis of the dividing ratio and the response time, and $b_i$ represents an influence of a size of each buffer pool on the response time when accessing data to be stored in the buffer pool; and a dividing ratio calculation step to calculate said dividing ratio that minimizes said response time by using said response time calculation formula the parameters of which are calculated by said response time calculation formula generating step;

wherein said dividing ratio setting step sets the dividing ratio calculated by said dividing ratio calculating step.

13. A computer program product comprising a computer usable medium having computer readable program code embodied therein for causing functions of a database server that optimizes the sizes of buffer pools for temporarily storing data from a database, the computer readable program code in said computer program product comprising computer readable program code for causing a computer to effect the functions of claim 1.

14. A program storage device readable by machine, tangibly embodying a program of instructions executable by the machine to perform method steps for causing a computer to optimize the sizes of buffer pools for temporarily storing data from a database, said method steps comprising the steps of claim 10.

15. A program storage device readable by machine, tangibly embodying a program of instructions executable by the machine to perform method steps for controlling a database server that optimizes the sizes of buffer pools for temporarily storing data from a database, said method steps comprising the steps of claim 12.

* * * * *